(12) United States Patent
Kim et al.

(10) Patent No.: US 9,056,981 B2
(45) Date of Patent: Jun. 16, 2015

(54) POLYAMIDE RESIN COMPOSITION WITH GOOD REFLECTANCE, IMPACT STRENGTH, HEAT RESISTANCE, AND WATER RESISTANCE AND METHOD OF PREPARING THE SAME

(75) Inventors: Pil Ho Kim, Uiwang-si (KR); In Sik Shim, Uiwang-si (KR); Jong Cheol Lim, Uiwang-si (KR); Sun Mi Park, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 445 days.

(21) Appl. No.: 12/972,811

(22) Filed: Dec. 20, 2010

(65) Prior Publication Data

US 2011/0160378 A1  Jun. 30, 2011

(30) Foreign Application Priority Data

Dec. 28, 2009  (KR) ........................ 10-2009-0132226

(51) Int. Cl.
| | | |
|---|---|---|
| C08K 3/22 | (2006.01) |
| C08L 77/00 | (2006.01) |
| C08K 7/14 | (2006.01) |
| C08L 51/06 | (2006.01) |

(52) U.S. Cl.
CPC . C08L 77/00 (2013.01); C08K 7/14 (2013.01); *C08K 2003/2241* (2013.01); *C08L 51/06* (2013.01)

(58) Field of Classification Search
USPC .................................................. 524/431, 504
See application file for complete search history.

(56) References Cited

U.S. PATENT DOCUMENTS

| | | | | |
|---|---|---|---|---|
| 5,124,391 | A * | 6/1992 | Muehlbach et al. | 524/420 |
| 2002/0147272 | A1 * | 10/2002 | Lee et al. | 525/71 |
| 2006/0094822 | A1 * | 5/2006 | Gaggar et al. | 525/178 |
| 2007/0161741 | A1 * | 7/2007 | Ogasawara | 524/494 |
| 2008/0167404 | A1 * | 7/2008 | Crowe et al. | 524/95 |
| 2009/0098325 | A1 * | 4/2009 | Uchida et al. | 428/36.91 |

FOREIGN PATENT DOCUMENTS

| | | |
|---|---|---|
| CN | 101006136 A | 7/2007 |
| WO | 2006/007580 A1 | 1/2006 |

OTHER PUBLICATIONS

English translation of Chinese Office Action in counterpart Chinese Application No. 201010611683.6 mailed Apr. 13, 2012, pp. 1-10.
Chinese Office Action in counterpart Chinese Application No. 201010611683.6 mailed Apr. 13, 2012, pp. 1-6.

* cited by examiner

*Primary Examiner* — Wenwen Cai
(74) *Attorney, Agent, or Firm* — Additon, Higgins & Pendleton, P.A.

(57) ABSTRACT

The present invention provides a polyamide resin composition comprising (A) about 100 parts by weight of polyamide resin; (B) about 0.1 to about 50 parts by weight of titanium dioxide; and (C) about 1 to about 20 parts by weight of modified polyolefin, wherein the (C) modified polyolefin is prepared by grafting a monomer that is partially miscible with the polyamide resin into the main chain of the polyolefin.

19 Claims, No Drawings

POLYAMIDE RESIN COMPOSITION WITH GOOD REFLECTANCE, IMPACT STRENGTH, HEAT RESISTANCE, AND WATER RESISTANCE AND METHOD OF PREPARING THE SAME

CROSS-REFERENCE TO RELATED APPLICATIONS

This application claims priority from Korea Patent Application No. 2009-132226, filed on Dec. 28, 2009, in the Korean Intellectual Property Office, the disclosure of which is incorporated herein by reference in its entirety.

FIELD OF THE INVENTION

The present invention relates to a polyamide resin composition that can have good reflectance, impact strength, heat resistance, and water resistance, and to a method of preparing the same.

BACKGROUND OF THE INVENTION

The history of nylon as an engineering plastic is close to 40 years, yet there still remains a high demand for the same. The continuing demand for nylon is due at least in part to the wide variety of types of nylon, such as nylon 6, nylon 6,6, nylon 6,10, nylon 6,12, nylon 11, nylon 12, and the like, and combinations or blends thereof, each of which has useful properties and various performance characteristics.

The mechanical properties and heat resistance of nylon can be improved by adding inorganic reinforcing material such as glass fiber. Reinforced nylon compositions can be used in applications such as structural materials and interior and exterior parts of automobiles.

Recently, there has been increased focus on nylon based resin as a material for components used in light emitting diodes (LEDs) and electro luminescence (EL) devices, because nylon has excellent energy efficiency and energy lifespan.

For example, modified nylon reinforced by glass fiber and including benzene rings in the main chains of the nylon has been used as a material for the production of various LED components having excellent energy efficiency and energy lifespan, such as reflectors, reflector cups, scramblers and housings. The modified nylon can withstand high temperatures used in the production of light emitting diodes. The modified nylon can also exhibit excellent reflectance with an initial high whiteness index, minimal deterioration of whiteness resulting from yellowing and can further block the flow of electricity.

Due to environmental regulation, lead-free solders, such as solders made of tin-silver alloy, are increasingly important. Lead-free solders generally have a higher melting point (around 260° C.) than conventional lead-containing solders. Currently the materials available as replacements for conventional lead-containing solders are largely limited to liquid crystal polymers (LCP), polyphenylene sulfides (PPS) and heat resistance polyamides.

LEDs generally include a semiconductor emitting a light, a lead wire, a reflector as a housing, and a transparent sealing product sealing the semiconductor. The reflector can be made of various materials such as ceramic or heat resistance plastics. Ceramics, however, can have problems with productivity and heat resistance plastics can have reduced optical reflectance resulting from changes in color that can occur during an injection molding process.

SUMMARY OF THE INVENTION

The present invention provides a polyamide resin composition that can have excellent heat resistance and a method for preparing the same. The present invention also provides a polyamide resin composition that can have excellent water resistance and a method for preparing the same. The present invention further provides a polyamide resin composition that can have excellent reflectance and a method for preparing the same. Still further, the present invention provides a polyamide resin composition that can have excellent heat resistance and water resistance without deteriorating reflectance and mechanical properties, such as impact strength and a method for preparing the same.

To solve these technical problems, the present invention provides a polyamide resin composition including polyamide resin, titanium dioxide, and a modified polyolefin prepared by grafting monomers that are miscible with the polyamide resin onto the main chain of the polyolefin. The resultant polyamide resin composition can have the above noted heat resistance and water resistance without deteriorated physical properties and reflectance.

In exemplary embodiments, the polyamide resin composition includes: (A) about 100 parts by weight of polyamide resin, (B) about 0.1 to about 50 parts by weight of titanium dioxide, and (C) about 1 to about 20 parts by weight of modified polyolefin, wherein the (C) modified polyolefin is prepared by grafting monomers that are miscible with the polyamide resin into the main chain of the polyolefin.

In exemplary embodiments of the invention, the main chains of the polyolefin can include about 70 to about 100% by weight of polyethylene, polypropylene, ethylene-propylene copolymer, or a combination thereof.

In exemplary embodiments of the invention, the monomer that is miscible with the polyamide resin includes a functional group that is miscible with the polyamide resin. Exemplary compounds with a functional group that is miscible with the polyamide resin include without limitation (meth)acrylic acid C1-C10 alkyl esters, modified esters, and combinations thereof. Exemplary modified esters may contain an unsaturated ethylene group and a functional group, such as an epoxide group, ethylene glycol, C6-C12 arylate, or CN group. Examples of the modified esters include without limitation glycidyl (meth)acrylate, ethylene glycol modified (meth)acrylate, C6-C12 arylate modified (meth)acylate, acrylonitrile, and the like, and combinations thereof.

The (C) modified polyolefin can include about 5 to about 50% by weight of the monomer that is miscible with the polyamide resin.

In exemplary embodiments of the invention, the polyamide resin composition further includes more than 0 to about 60 parts by weight of (D) filler. The (D) filler can be, for example, glass fiber.

In exemplary embodiments of the invention, the polyamide resin composition can have an initial reflectance value of more than about 85 at a wavelength of 440 nm measured according to CIE Lab color difference evaluation criteria using a Minolta 3600D spectrophotometer.

In exemplary embodiments of the invention, the polyamide resin composition further can exhibit a decline of reflectance value of less than about 15 when reflectance is measured again after exposure to conditions of 85° C. and 85% relative humidity for 96 hours.

In other exemplary embodiments of the invention, the polyamide resin composition can exhibit a change of initial yellow index (ΔYI) of less than about 10 measured according to CIE Lab color difference evaluation criteria using a Minolta 3600D spectrophotometer after exposure to conditions of 85° C. and 85% relative humidity for 96 hours.

The present invention also provides a method of producing a polyamide resin composition with good reflectance, impact strength, heat resistance, and water resistance, comprising mixing (A) about 100 parts by weight of polyamide resin; (B) about 0.1 to about 50 parts by weight of titanium dioxide; and (C) about 1 to about 20 parts by weight of modified polyolefin, wherein the modified polyolefin is prepared by grafting a monomer that is miscible with the polyamide resin into a main chain of the polyolefin.

The present invention further provides an article prepared from the polyamide resin composition. In exemplary embodiments of the invention, the article prepared from the polyamide resin composition is a reflector for a LED.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a polyamide resin composition comprising: (A) about 100 parts by weight of polyamide resin, (B) about 0.1 to about 50 parts by weight of titanium dioxide, and (C) about 1 to about 20 parts by weight of modified polyolefin, wherein the (C) modified polyolefin is prepared by grafting a monomers that is miscible with the polyamide resin into a main chain of the polyolefin.

(A) Polyamide Resin

The polyamide resin of the present invention is an aromatic polyamide resin structure having a benzene ring in a main chain thereof and can be prepared by condensation polymerization of a dicarboxylic acid including about 10 to about 100 mole % of an aromatic dicarboxylic acid with a monomer including an aliphatic diamine, an alicyclic diamine, or a combination thereof.

Exemplary aromatic dicarboxylic acids include without limitation terephthalic acid, isophthalic acid, and combinations thereof, which, as shown in Formula 1 below have a main chain containing a benzene ring.

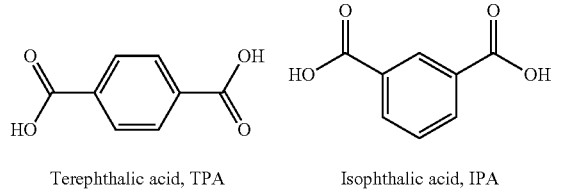

Terephthalic acid, TPA    Isophthalic acid, IPA

[Formula 1]

The aliphatic and/or alicyclic diamine can have 4 to 20 carbon atoms.

An exemplary aromatic polyamide includes an aromatic polyamide prepared by condensation polymerization of hexamethylene diamine and terephthalic acid, as represented by Formula 2 below, which is referred to as PA 6T.

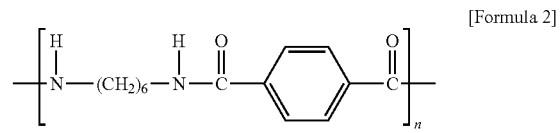

[Formula 2]

wherein n is a integer of 50 to 500.

The aromatic polyamide having a benzene ring in a main chain thereof further can have a melting point of more than about 150° C.

Exemplary aromatic polyamides can include without limitation polytetramethylene adipamide (PA 46), polycaproamide/polyhexamethylene terephthalamide copolymer (PA6/6T), polyhexamethylene adipamide/poly hexamethylene terephthalamide copolymer (PA66/6T), polyhexamethyleneadipamide/polyhexamethylene isophthalamide copolymer (PA66/6I), polyhexamethylene terephthalamide/polyhexamethylene isophthalamide copolymer (PA6T/6I), polyhexamethylene terephthalamide/polydodecanamide copolymer (PA6T/12), poly hexamethylene adipamide/poly hexamethylene terephthalamide/polyhexamethylene isophthalamide copolymer (PA66/6T/6I), polyxylene adipamide (PA MXD6), poly hexamethylene terephthalamide/poly 2-methylpentamethylene terephthalamide copolymer (PA 6T/M5T), nylon 10T/1012, polyhexamethylene terephthalamide (PA 6T), poly nonamethylene terephthalamide (PA 9T), polydecamethylene terephthalamide (PA 10T), polyamide 11T (PA 11T), polyamide 12T (PA 12T), and the like, and combinations thereof.

(B) Titanium Dioxide

The present invention includes white pigment, particularly titanium dioxide, in order to impart excellent reflection properties to the polyamide resin composition. If white pigment such as zinc oxide or zinc sulfide is used, initial whiteness of the polyamide resin composition may be obtained; however, discoloration can easily occur after the composition is exposed to temperature and humidity conditions noted herein (that is, conditions of 85° C. and 85% relative humidity).

The titanium dioxide is not limited with regard to preparation method and/or particle size and any conventional titanium oxide known in the art may be used. The titanium dioxide may be coated with an inorganic or organic surface treatment agent.

Exemplary inorganic surface treatment agents include without limitation $Al_2O_3$, $SiO_2$, $ZrO_2$, sodium silicate, sodium aluminate, sodium silicate aluminum, zinc oxide, mica, and the like, and combinations thereof.

Exemplary organic surface treatment agents include without limitation polydimethylsiloxane, trimethylpropane (TMP), pentaerythritol, and the like, and combinations thereof.

The titanium dioxide may be coated with about 0.3 parts or less by weight of the inorganic or organic surface treatment agent, based on about 100 parts by weight of titanium dioxide.

In an exemplary embodiment, the titanium dioxide is coated with less than about 2 parts by weight of $Al_2O_3$ as an inorganic surface treatment agent, based on about 100 parts by weight of titanium dioxide.

Titanium dioxide coated with $Al_2O_3$ can be further coated with another inorganic surface treatment agent such as $SiO_2$, $ZrO_2$, sodium silicate, sodium aluminate, sodium silicate aluminum, mica and the like or an organic surface treatment agent such as polydimethylsiloxane, trimethylpropane (TMP), pentaerythritol and the like, as well as combinations of any of the foregoing.

The polyamide resin composition can include the titanium dioxide (B) in an amount of about 0.1 to about 50 parts by weight, for example, about 5 to about 30 parts by weight, based on about 100 parts by weight of the polyamide resin (A). In some embodiments, the polyamide resin composition may include the titanium dioxide (B) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the titanium dioxide (B) can be in a range from about any of the foregoing amounts to about any other of the foregoing amounts.

If less than about 0.1 parts by weight of the titanium dioxide is used, light resistance may be deteriorated. If more about 50 parts by weight of the titanium dioxide is used, impact strength resistance may be deteriorated.

(C) Modified Polyolefin

The modified polyolefin used in the polyamide resin composition of the invention is a branch grafted copolymer. The modified polyolefin includes a main chain of polyolefin and includes functional groups grafted onto the main chain.

The inventors have found that if the titanium dioxide and the modified polyolefin are used simultaneously, the polyamide resin composition may not only have an excellent surface reflectance but also have improved heat resistance and water resistance. The polyolefin has chemical resistance and hydrophobic properties, and a polyamide resin composition including the above polyolefin also may have hydrophobic properties. Further, although polyamide resin can absorb moisture, the use of the modified polyolefin can in effect block the moisture absorbing properties of the polyamide. As a result, by preventing the acceleration of moisture degradation upon exposure to a high temperature and high humidity environment, the degree of yellowing of the resin composition may be prevented. This effect can be achieved using a titanium dioxide and a modified polyolefin together. If only the modified polyolefin is used, initial whiteness or reflectance may be deteriorated, and furthermore, after exposure to a high temperature and high humidity environment, the decline of reflectance may be severe and there may be significant yellowing.

The modified polyolefin of the invention has a structure in which a monomer that is miscible with the polyamide resin is grafted as a branch into the main chain of the polyolefin. If the monomer that is miscible with the polyamide resin does not graft into the main chain of the polyolefin, exfoliation (also delamination or peeling) may occur due to deteriorating miscibility with the polyamide resin.

In an exemplary embodiment of invention, the modified polyolefin may be prepared by copolymerizing an olefin with a compound including a functional group that is miscible with the polyamide resin. Exemplary compounds with a functional group that is miscible with the polyamide resin include without limitation (meth)acrylates (for example, (meth)acrylic acid C1-C10 alkyl esters), modified esters, and the like, and combinations thereof. The modified esters may contain an unsaturated ethylene group and a functional group, such as an epoxide group, ethylene glycol, C6-C12 arylate, CN group, and the like. Examples of the modified esters include without limitation glycidyl (meth)acrylate, ethylene glycol modified (meth)acrylate, C6-C12 arylate modified (meth)acylate, acrylonitrile, and the like, and combinations thereof.

The main chain of the modified polyolefin may include more than about 70% by weight of polyethylene, polypropylene or ethylene-propylene copolymer.

The above monomer which grafts to the polyolefin main chain to form a branch can be at least partially miscible with the polyamide resin. Exemplary (meth)acrylates include without limitation methyl acrylate, ethyl acrylate, butyl acrylate, methyl methacrylate, ethyl methacrylate, butyl methacrylate and the like, and combinations thereof.

The modified polyolefin includes branches formed by grafting monomers having partial miscibility with the polyamide resin in an amount of about 5 to about 50% by weight, for example about 5 to about 40% by weight, and as another example about 7 to about 30% by weight, per total amount of modified polyolefin (C). In some embodiments, the modified polyolefin (C) can include branches formed by grafting monomers having partial miscibility with the polyamide resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the monomer having partial miscibility with the polyamide resin can be in a range from about any of the foregoing amounts to about any other of the foregoing amounts.

If the amount of the branch parts is less than about 5% by weight, exfoliation (also delamination or peeling) may occur due to poor miscibility with the polyamide resin. If the amount of the branch parts is more than about 50% by weight, impact strength resistance may be deteriorated because the material may have poor impact resistance.

The polyamide resin composition of the invention can include the modified polyolefin (C) in an amount of about 1 to about 20 parts by weight, for example about 1 to about 15 parts by weight, and as another example about 1.5 to about 10 parts by weight, based on about 100 parts by weight of (A) the polyamide resin. In some embodiments, the polyamide resin composition may include the modified polyolefin (C) in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the modified polyolefin (C) can be in a range from about any of the foregoing amounts to about any other of the foregoing amounts.

If the amount of the modified polyolefin is less than about 1 part by weight, there may be only a slight or minimal improvement in impact strength, chemical resistance and reflectance. If the amount of the modified polyolefin is more than about 20 parts by weight, heat resistance may be deteriorated.

(D) Filler

The polyamide resin composition of the present invention can include filler in various forms, such as but not limited to fiber, powder, particle, flake, needle, cloth, mat, and the like, and combinations thereof, in order to improve mechanical properties, heat resistance and dimensional stability of the resin composition.

In exemplary embodiments of the invention, the polyamide resin composition can include the filler in an amount greater than about 0 (i.e., the filler is present in the composition) to about 60 parts by weight, based on about 100 parts by weight of the polyamide resin (A). In some embodiments, the polyamide resin composition may include the filler (D) in an amount of about and/or greater than 0, 1, 2, 3, 4, 5, 6, 7, 8, 9, 10, 11, 12, 13, 14, 15, 16, 17, 18, 19, 20 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight. Further, according to some embodiments of the present invention, the amount of the filler (D) can be in a range from about any of the foregoing amounts to about any other of the foregoing amounts.

In the present invention, any conventional organic and/or inorganic filler can be used. Exemplary filler includes without limitation carbon fibers, glass fibers, boron fibers, glass beads, glass fibers, carbon black, diatomaceous earth, clay, kaolin, talc, mica, calcium carbonate, filler in needle form, and the like, and combinations. Examples of filler in needle form include without limitation wollastonite, potassium titanate whiskers, aluminum boric acid whiskers, zinc oxide whiskers, calcium whiskers, and the like, and combinations thereof. In exemplary embodiments, glass fiber can be used, which can provide high impact strength and lower cost. In other exemplary embodiments, filler in the form of needles can be used, which can provide an article with excellent surface smoothness. In other exemplary embodiments of the invention, glass fiber, wollastonite, potassium titanate whiskers and aluminum boric acid whiskers can be used to provide high whiteness.

The glass fiber can have a circular or round cross section. The present invention, however, is not limited to the use of fibers with round cross sections, and accordingly fibers with other cross sectional shapes can also be used.

In addition, the polyamide resin composition of the present invention may further include one or more additives(s) such as but not limited to fluorescence brightening agents, lubricants, release agents, nucleating agents, antistic agents, UV stabilizers, stabilizers, reinforcement materials, inorganic additives, colorants such as dyes or pigments, and the like, and combinations thereof. The additive(s) can be used on conventional amounts, so long as the additives do not significantly compromise other desired properties of the compositions. The skilled artisan can readily select the types and amounts of additives without undue experimentation depending on the use of the compositions and the desired additional properties thereof.

The UV stabilizers play a role of suppressing color change and decline of light reflectance of the polyamide resin composition upon exposure to UV irradiation. Exemplary UV stabilizers include without limitation benzotriazole-type UV stabilizers, benzophenone-type UV stabilizers, triazine-type UV stabilizers and the like, and combinations thereof.

The fluorescence brightening agents play a role of enhancing light reflectance of polyamide resin composition. Exemplary fluorescence brightening agents include without limitation stilbene-bis benzoxazole derivatives such as 4-(benzoxazole-2-yl)-4'-(5-methyl benzoxazole-2-yl)stilbene, 4,4'-bis(benzoxazole-2-yl)stilbene, and the like, and combinations thereof.

Exemplary release agents include without limitation polymers containing fluorine, silicon oils, metal salts of stearic acid, metal salts of montanic acid, ester waxes of montanic acid, polyethylene waxes, and the like, and combinations thereof.

Exemplary nucleating agents include without limitation talc, clay, and the like, and combinations thereof.

The polyamide composition resin of the present invention can have an initial reflectance of more than about 85 at a wavelength of 440 nm. Further, after maintaining the composition under conditions of 85° C. and 85% of relative humidity for 96 hours, the composition can exhibit a decline in reflectance of less than about 15 at a wavelength of 440 nm and degree (change) of yellowing ($\Delta YI$) of less than about 10. Accordingly, the polyamide resin composition of the present invention can be used in articles requiring good reflectance properties, in addition to excellent heat resistance and water resistance. Further, the polyamide resin composition of the present invention can exhibit excellent reflectance and impact strength by including proper amounts of both titanium dioxide and modified polyolefin, and also heat resistance and water resistance may also be improved with minimal decline in the reflectance and degree of yellowing exhibited by the composition after exposure to the proceeding constant temperature and constant humidity (i.e., 85° C. and 85% of relative humidity). Therefore, the polyamide resin composition can be used as a LED reflector material which is continuously exposed to a high temperature environment. Also, the polyamide resin composition can have a strong resistance against moisture by including a hydrophobic modified polyolefin, and accordingly, it can prevent degradation by moisture.

The polyamide resin composition of the present invention can be adapted not only for LED applications, but also for other applications reflecting light beams. For example, it is possible to use the polyamide resin composition as a material for a reflector plate for a light emitting device such as various electric/electronic products, indoor lighting, indicators, outdoor lighting, automobile lighting, display apparatus, headlights, and the like.

The invention may be better understood by reference to the following examples which are intended for the purpose of illustration and are not to be construed as in any way limiting the scope of the present invention, which is defined in the claims appended hereto.

EXAMPLE

The (A) polyamide resin, (B) titanium dioxide, (C) modified polyolefin and (D) filler used in the Examples and Comparative Examples are as below.

(A) Polyamide Resin

A high heat resistance modified nylon, polyphthalamide C3200A manufactured by Mitsui Company, including benzene rings in the main chain is used in the Examples and Comparative Examples.

(B) Titanium Dioxide

Chronos 2233 manufactured by Chronos Inc. is used in the Examples and Comparative Examples.

(B') Zinc Sulfide

A zinc sulfide (Sachtolith HD-L manufactured by SACHTLEBEN CHEM Inc.) is used in Comparative Example 6 instead of the above titanium dioxide.

(C) Modified Polyolefin

An ethylene acrylate, EVAFLEX A714 manufactured by DuPont CO., LTD., is used in the Examples and Comparative Examples.

(C') Polyethylene

A polyolefin C820A manufactured by SAMSUNG TOTAL is used in Comparative Example 7, instead of the above modified polyolefin.

(D) Filler

Glass fiber 910 manufactured by Vetrotex Co., LTD. is used in the Examples and Comparative Examples.

Examples 1~4 and Comparative Examples 1~5

The components are mixed together in the ratios shown in Table 1 using a tumbler blender, and are fed into a twin-screw extruder equipped with a vent and melt-mixed therein at a set point temperature of 240~320° C. to prepare chip-shaped resin compositions. Then, the obtained resin compositions in chip form are dried for 5 hours at 130° C., and specimens for evaluating mechanical properties are prepared using a screw-injector which is heated to 240~330° C.

TABLE 1

| Components | Examples | | | | Comparative Examples | | | | | | |
|---|---|---|---|---|---|---|---|---|---|---|---|
| | 1 | 2 | 3 | 4 | 1 | 2 | 3 | 4 | 5 | 6 | 7 |
| (A) Polyamide resin | 100 | 100 | 100 | 100 | 100 | 100 | 100 | 100 | 100 | 100 | 100 |
| (B) Titanium oxide | 15 | 15 | 30 | 30 | 15 | 15 | — | 60 | — | — | 15 |
| (B') Zinc sulfide | — | — | — | — | — | — | — | — | — | 15 | — |
| (C) Modified polyolefin | 5 | 15 | 15 | 15 | — | 40 | 15 | 15 | — | 5 | — |
| (C') Polyolefin | — | — | — | — | — | — | — | — | — | — | 15 |
| (D) Filler | 20 | 20 | 20 | — | 20 | 20 | 20 | 20 | 20 | 20 | 20 |

The respective properties of the resin compositions prepared in accordance with at ratios shown in Table are evaluated by following methods and the results thereof are shown in Table 2.

Method for Measuring Properties

In the Examples and Comparative Examples, the measurement and evaluation of the respective properties are carried out according to the methods described below.

(1) Heat resistance (HDT): Measured in accordance with ASTM D648.

(2) Reflectance: Initial reflectance (SCI, specular component included) at a wavelength of 440 nm is measured according to CIE Lab color difference evaluation criteria using a Minolta 3600D spectrophotometer, and then is measured again after maintaining the specimen under conditions of 85° C. and 85% relative humidity for 96 hours. The decrease in reflectance is evaluated.

(3) Non-yellowing property (UV resistance): Initial yellow index is measured according to CIE Lab color difference evaluation criteria using a Minolta 3600D spectrophotometer, and then is measured again after maintaining the specimen under conditions of 85° C. and 85% relative humidity for 96 hours. The change of yellow index is evaluated.

(4) Impact strength: Measured in accordance with ASTM D256.

(5) Exfoliation property: Measured with the naked eye to determine whether exfoliation (also delamination or peeling) occurs after molding at a mold.

TABLE 2

| | | Examples | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| HTD (° C.) | | 282 | 274 | 283 | 271 | 290 | 210 | 265 | 287 | 275 | 280 | 159 |
| Reflectance ratio (SCI) | Before Constant Temperature & Humidity | 90.0 | 90.1 | 90.8 | 91.2 | 88.5 | 90.5 | 43.2 | 91.7 | 39.5 | 84.5 | 84.9 |
| | After 96 Hours of Constant Temperature & Humidity | 76.4 | 80.5 | 82.7 | 84.4 | 59.1 | 68.9 | 18.3 | 80.5 | 19.2 | 36.6 | 74.4 |
| | Difference of reflectance | 13.6 | 9.6 | 8.1 | 6.8 | 29.4 | 21.6 | 24.9 | 11.2 | 20.3 | 47.9 | 10.5 |
| YI | Before Constant Temperature & Humidity | 3.8 | 3.9 | 2.7 | 2.7 | 2.6 | 4.2 | 16.2 | 3.4 | 15.3 | 5.6 | 5.4 |
| | After 96 Hours of Constant Temperature & Humidity | 12.4 | 9.7 | 5.9 | 5.5 | 20.7 | 23.3 | 39.5 | 5.8 | 37.9 | 19.2 | 14.1 |
| | Color Difference (YI) | 8.6 | 5.8 | 3.2 | 2.8 | 18.1 | 19.1 | 23.3 | 2.4 | 22.6 | 13.6 | 8.7 |
| Impact strength (kg, cm/cm) | | 3.7 | 4.2 | 3.5 | 4.5 | 3.5 | 5.3 | 3.7 | 2.7 | 1.8 | 2.9 | 3.0 |
| Exfoliation Property | | NO | NO | NO | NO | NO | NO | NO | NO | NO | NO | YES |

As shown Table 2, the polyamide resin compositions of Examples 1 to 4 not only exhibit good heat resistance, but also have excellent reflectance and non-yellowing properties. Specifically, if (B) titanium dioxide and (C) modified polyolefin are not used simultaneously or is used in an amount outside of the range of the present invention, reflectance and non-yellowing properties may be deteriorated. With regard to Comparative Example 1 which does not include (C) modified polyolefin and Comparative Example 3 which does not include (B) titanium dioxide, reflectance and non-yellowing properties may be deteriorated. For example, Comparative Example 3, which does not include (B) titanium dioxide, exhibits a significant decline in reflectance and a high degree of yellowing, as well as poor initial reflectance. Comparative Example 2, which includes (C) modified polyolefin in an amount greater than the present invention, exhibits deteriorated heat resistance. Also, Comparative Example 4, which includes (B) titanium dioxide in an amount greater than the present invention, exhibits deteriorated impact strength. Further, Comparative Example 5, which does not include (B) titanium dioxide or (C) modified polyolefin, exhibits deteriorated reflectance and non-yellowing properties. Also, in Comparative Example 6, which includes (B') zinc sulfide as a white pigment instead of titanium dioxide, initial reflectance is good, but reflectance and non-yellowing properties significantly deteriorate after exposure to constant temperature and constant humidity. Comparative Example 7, which includes (C') polyethylene instead of a modified polyolefin in accordance with the invention, exhibits exfoliation due to insufficient miscibility with the polyamide resin composition.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polyamide resin composition comprising:
   (A) about 100 parts by weight of polyamide resin;
   (B) about 5 to about 50 parts by weight of titanium dioxide; and
   (C) about 1 to about 15 parts by weight of modified polyolefin,
   wherein the (C) modified polyolefin is prepared by grafting a monomer that is partially miscible with the polyamide resin into the main chain of the polyolefin, and wherein the (C) modified polyolefin comprises greater than 10% by weight to about 50% by weight of the monomer that is partially miscible with the polyamide resin.

2. The polyamide resin composition of claim 1, wherein the (A) polyamide resin includes repeating units of dicarboxylic acid and aliphatic diamine, alicyclic diamine, or a combination thereof.

3. The polyamide resin composition of claim 1, wherein the (A) polyamide resin is represented by Formula 1 below:

[Formula 1]

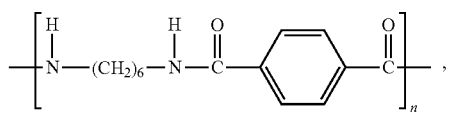

wherein n is an integer of 50 to 500.

4. The polyamide resin composition of claim 1, wherein the main chain of the modified polyolefin includes about 70 to about 100% by weight of polyethylene, polypropylene, or ethylene-propylene copolymer.

5. The polyamide resin composition of claim 1, wherein the monomer that is partially miscible with the polyamide resin comprises a (meth)acrylic acid C1-C10 alkyl ester, a modified ester, or a combination thereof.

6. The polyamide resin composition of claim 5, wherein the monomer that is partially miscible with the polyamide resin comprises a (meth)acrylic acid C1-C10 alkyl ester.

7. The polyamide resin composition of claim 6, wherein the monomer that is partially miscible with the polyamide resin comprises methyl acrylate, ethyl acrylate, butyl acrylate, or a combination thereof.

8. The polyamide resin composition of claim 5, wherein the modified ester comprises an unsaturated ethylene group and a functional group.

9. The polyamide resin composition of claim 8, wherein the functional group comprises epoxide, ethylene glycol, C6-C12 arylate, or CN.

10. The polyamide resin composition of claim 8, wherein the modified ester comprises glycidyl (meth)acrylate, ethylene glycol modified (meth)acrylate, C6-C12 arylate modified (meth)acylate, acrylonitrile, or a combination thereof.

11. The polyamide resin composition of claim 1, wherein the polyamide resin composition further comprises greater than 0 to about 60 parts by weight of (D) filler.

12. The polyamide resin composition of claim 11, wherein the (D) filler is glass fiber.

13. The polyamide resin composition of claim 1, wherein the polyamide resin composition exhibits an initial reflectance value at a wavelength of 440 nm of more than about 85 as measured according to CIE Lab color difference evaluation criteria using a Minolta 3600D spectrophotometer, and a decline of reflectance value of less than about 15 when measured again after maintaining the polyamide resin composition under conditions of 85° C. and relative humidity of 85% for 96 hours.

14. The polyamide resin composition of claim 1, wherein the polyamide resin composition exhibits a change of initial yellow index ($\Delta YI$) of less than about 10 as measured according to CIE Lab color difference evaluation criteria using a Minolta 3600D spectrophotometer after maintaining the polyamide resin composition under condition of 85° C. and relative humidity of 85% for 96 hours.

15. A method of producing a polyamide resin composition comprising mixing (A) about 100 parts by weight of polyamide resin; (B) about 5 to about 50 parts by weight of titanium dioxide; and (C) about 1 to about 20 parts by weight of modified polyolefin, wherein the modified polyolefin is prepared by grafting a monomer that is partially miscible with the polyamide resin into the main chain of the polyolefin, and wherein the (C) modified polyolefin comprises greater than 10% by weight to about 50% by weight of the monomer that is partially miscible with the polyamide resin.

16. The method of producing a polyamide resin composition of claim 15, wherein the monomer that is partially miscible with the polyamide resin comprises a (meth)acrylic acid C1-C10 alkyl ester, a modified ester, or a combination thereof.

17. The method of producing a polyamide resin composition of claim 15, wherein the polyamide resin composition further comprises greater than 0 to about 60 parts by weight of (D) filler.

18. An article prepared from the polyamide resin composition of claim 1.

19. The article of claim 18, wherein the article is a reflector for a LED.

* * * * *